United States Patent [19]

Baas et al.

[11] Patent Number: 5,001,689

[45] Date of Patent: Mar. 19, 1991

[54] METHOD OF PARTITIONING THE MEMORY IN A CD-PLAYER IN ORDER TO REDUCE ACCESS TIME TO THE DISK

[75] Inventors: Dieter Baas, Kehl; Hans-Robert Kühn, St. Georgen, both of Fed. Rep. of Germany

[73] Assignee: Deutsche Thomson-Brandt GmbH, Villingen-Schwenningen, Fed. Rep. of Germany

[21] Appl. No.: 249,284

[22] Filed: Sep. 26, 1988

[30] Foreign Application Priority Data

Sep. 30, 1987 [DE] Fed. Rep. of Germany ....... 3732983

[51] Int. Cl.[5] .............................................. G11B 17/22
[52] U.S. Cl. ........................................ 369/33; 369/30; 369/32; 360/49
[58] Field of Search .................. 369/30, 32, 33, 41; 360/49

[56] References Cited

U.S. PATENT DOCUMENTS

| | | | |
|---|---|---|---|
| 3,918,027 | 11/1975 | Lechner | 360/49 X |
| 4,307,418 | 12/1981 | Mindel et al. | 369/30 X |
| 4,325,120 | 4/1982 | Colley et al. | 364/200 |
| 4,425,615 | 1/1984 | Swenson et al. | 364/200 |
| 4,740,938 | 4/1988 | Bierhoff et al. | 369/32 |
| 4,779,252 | 10/1988 | Custers et al. | 369/33 X |
| 4,872,151 | 10/1989 | Smith | 369/33 X |
| 4,914,577 | 4/1990 | Stewart et al. | 364/200 |
| 4,930,072 | 5/1990 | Agrawal et al. | 364/200 |

FOREIGN PATENT DOCUMENTS

2939912A1 9/1981 Fed. Rep. of Germany .

OTHER PUBLICATIONS

A Funkschau Article (Funkschau 15/1986, pp. 26-28), entitled "Zusammenstellen eines CD-Programms".

Primary Examiner—William M. Shoop, Jr.
Assistant Examiner—Randy W. Gibson
Attorney, Agent, or Firm—Joseph S. Tripoli; Peter M. Emanuel; Thomas F. Lenihan

[57] ABSTRACT

In CD-players with a memory (S) having A storage locations for the storing of the titles recorded on a CD-record, it can occur that the number of titles C recorded on the CD-record exceeds the number of storage locations A in the CD-player.

In order to keep the access times for individual titles low, the memory (S) is partitioned into a first part (T1), having B storage positions, and a second part T2, having A-B storage positions. The titles 1 to B are stored in sequence in the B storage locations of the T1 portion of memory S. The remaining titles are distributed to the A-B storage locations of the part (T2) such that, no continuing sequence with the first B titles is formed. For example, the remaining C-B titles may be distributed evenly in the second part (T2) of memory S.

15 Claims, 3 Drawing Sheets

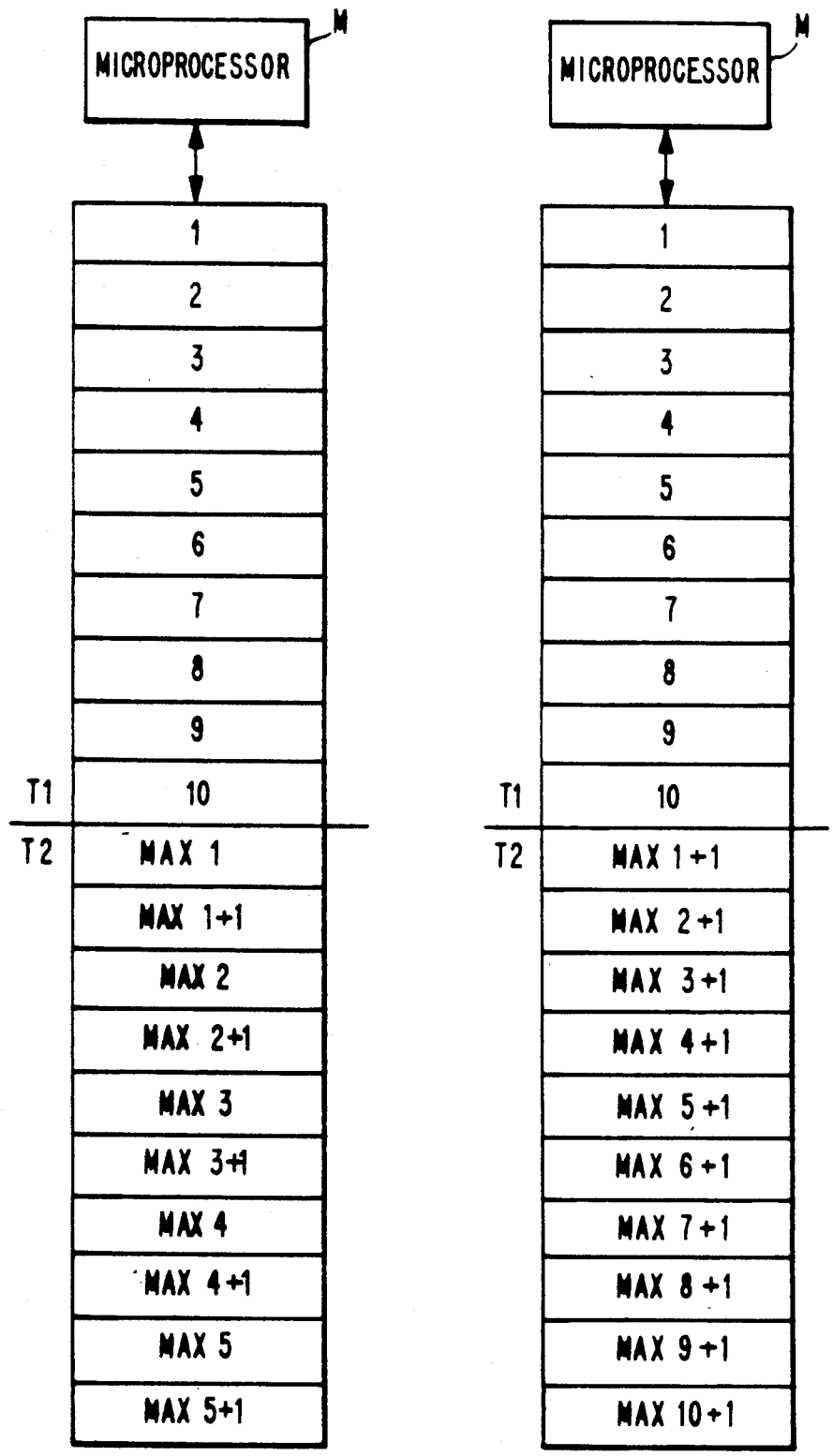

METHOD OF PARTITIONING THE MEMORY IN A CD-PLAYER IN ORDER TO REDUCE ACCESS TIME TO THE DISK

The invention is related to the field of compact disc players (CD-players) with a memory having storage positions for storing the index of an inserted CD-record.

FIELD OF THE INVENTION

A description of which data are stored on a CD-record and how the same are processed, is set forth in the publication "Zusammenstellen eines CD-Programms" (composition of a CD-program) in Funkschau No. 15, July 18, 1986 on the pages 26 to 28.

Every CD-record contains an index, in which data are stored, which give information about the number of program blocks, the start times of the latter, and the total playing time of the record. The individual program blocks normally contain pieces of music, but may also contain, for example, spoken text or various sound effects for the setting to music (or noises) of films and photographic slides. Up to 99 program blocks can be stored on a CD-record, but typically only 10 to 20 varying pieces of music are stored on a CD-record.

The index of a CD-record has the data representation shown in FIG. 1. In the first block A0 is the title of the first piece of music, in the second block A1 the title of the last piece of music and in the third block A2 is written the total playing time of the CD-record. In the following blocks D1 to Dn are the starting times of the separate n pieces of music, which are recorded on the CD-record. The blocks A0, A1, A2, and D1 to Dn are combined to one group $G_1$, in which the index of the CD-record is completely stored.

The total storage space provided on a CD-record for the index is completely occupied with several of the groups, for example, G2 and Gm, directly following each other, so that the data of the index of the CD-record are stored with multiple redundancy.

During playback, the starting time data D1 to Dn, in which as many as three pieces of music make up the largest part of the data stored in the index, serves to calculate the starting times of the separate pieces of music.

After insertion of a CD-record into the CD-player the separate titles of the index are read from the CD-record and stored in the memory of the CD-player. Usually the available storage space is sufficient for all titles. But there also exist CD-records with more titles than can be accommodated by the space in the memory of the CD-player. If for instance the CD-player can store ten titles, but there are twenty titles recorded on the inserted CD-record, the access times to the unstored titles are raised. That is, because the first ten titles are stored in the memory of the CD-player, the access time to these titles is in fact small, but for the unstored remaining ten titles, the access time would be disproportionately great.

SUMMARY OF THE INVENTION

It is therefore an object of the invention to lower the access times of a CD-player when more titles are recorded on a CD-record than can be contained within the memory of a CD-player.

The invention solves this object in that a memory of a CD-player having A storage locations is divided into a first part (T1) having B storage locations, and a second part (T2) having A-B storage locations, wherein when a CD-record contains more titles than there are storage locations in a CD-player, the first B titles are stored in sequence in the first part (T1) of the memory of the CD-player, and in the remaining A-B storage locations (T2) are stored non-sequential titles.

BRIEF DESCRIPTION OF THE DRAWING

FIG. 5 illustrates memory locations of a CD-player partitioned in a fourth arrangement in accordance with yet another aspect of the invention.

FIG. 6 illustrates memory locations of a CD-player partitioned in a fifth arrangement in accordance with yet another aspect of the invention.

DETAILED DESCRIPTION OF THE EMBODIMENTS

The invention will be described with reference to FIGS. 2 to 6 in which a microprocessor M controls the partitioning of a memory S.

Figure 1:
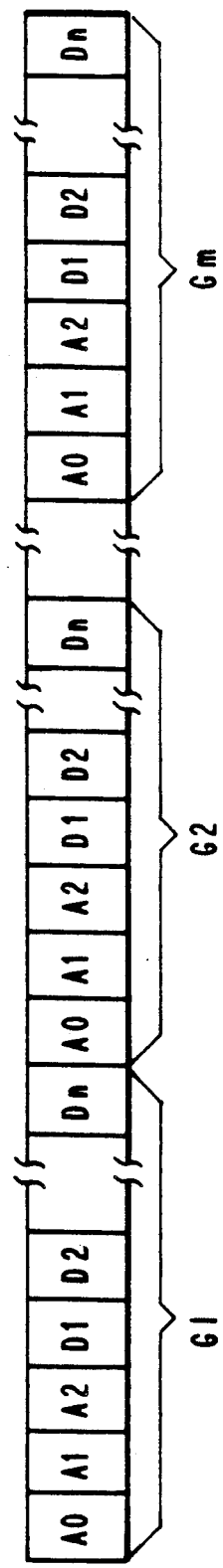
FIG. 1 illustrates an arrangement of the data in the index of a CD-record, as known from the prior art.
Figures 2, 3, 4:
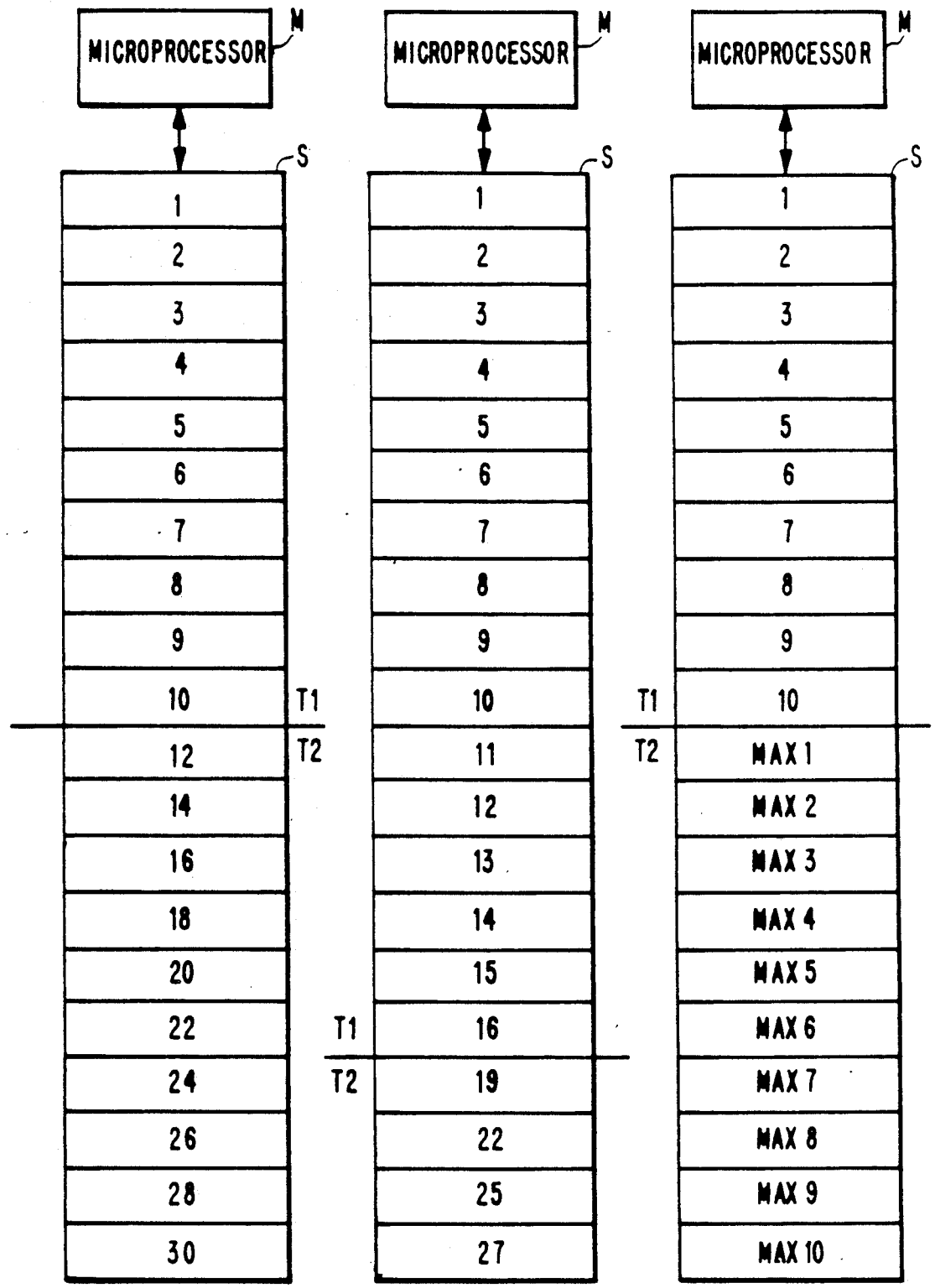
FIG. 2 illustrates memory locations of a CD-player partitioned in a first arrangement in accordance with an aspect of the invention.
FIG. 3 illustrates memory locations of a CD-player partitioned in a second arrangement in accordance with another aspect of the invention.
FIG. 4 illustrates memory locations of a CD-player partitioned in a third arrangement in accordance with still another aspect of the invention.

Referring to FIG. 2, the memory S of a CD-player may have, for example, 20 storage positions A for storing titles, but an inserted CD-record may have, for example, 30 titles C recorded on it. In accordance with one aspect of the subject invention, memory S is divided, or partitioned, into a first part T1 having B storage locations, and a second part T2 having A-B storage locations.

If B is chosen to be 10, then there are 10 storage positions available in each of parts T1 and T2 of the memory. In each of the 10 storage locations of part T1, there are stored in sequence the first ten titles (1–10) of the CD-record. All of the remaining 20 titles cannot be stored because there are only 10 remaining storage locations. Therefore, only the (C-B)/(A-B) th =(30-10)/(20-10) th=second title in sequence is stored. That is, every other remaining title is stored. Therefore, only titles 12, 14, 16 to 30 in sequence are stored in part T2 of the memory of the CD-player.

Because of the above-described storage technique the access times to titles 11 to 30 are only insignificantly greater than the access times to titles 1 to 10. Thus, for all titles almost equal access times are achieved. That is, the problem of having very short access times to some titles and very great access times to others is eliminated by use of the invention.

Referring to FIG. 3, if the number of CD-player memory storage locations A is 20, and the number of titles on a particular CD-record C is 27, then the number of locations in the first part of memory B can be chosen as, for example, 16. Therefore, using the above-given formula, every (27-16)/(20-6)th=11/4th or 2.75th title should be stored. When a fractional portion of a title occurs, the number should be rounded up to the next higher integer. Accordingly, every 3rd title will be stored in the remaining (T2) portion of memory which in this example comprises (A-B)=(20-6) or 4 memory locations. Thus, titles 1-16 are stored in the first part (T1) of memory A and titles 19, 22, 25 and 27 are stored in the second part (T2) of memory A.

Referring to FIG. 4, a memory S, also having 20 storage locations, is divided into a first portion T1, having B=10 storage locations, and a second portion T2, having A-B=20-10, or 10 storage locations. For purposes of this example, a CD-record having 32 titles in its index is inserted into the CD-player.

As explained above with reference to FIG. 2, the first 10 titles are stored in sequence in the first part (T1) of memory S. The 10 titles corresponding to 10 recordings of the greatest length are selected from the remaining C-B=32-20, or 22 titles. The 10 selected titles (MAX 1 to Max 10) corresponding to the 10 recordings of greatest length are stored in the second portion (T2) of memory S.

If the recordings corresponding to the titles of a CD-record differ greatly in length from one another (i.e. some short and some long selections are recorded), then it is possible to achieve shorter access times by using the technique illustrated FIG. 4, than by use of the technique of FIG. 2.

In a further example, shown in FIG. 5, the parameters A, B and C have the same values as given immediately above (i.e. A=20, B=10 and C=32). Likewise to the immediately preceding example, the first ten titles (1 to 10) are stored in sequence in the ten storage locations T1 of memory S. Of the remaining 22 titles, the five titles (MAX1 to MAX5) corresponding to the five longest recordings are stored consecutively in every other storage location of the second part T2 of memory S.

In the remaining five memory locations of T2 are stored the titles of the recordings which immediately follow the recordings corresponding to titles MAX1 to MAX5. Therefore, the titles MAX1, MAX1+1, MAX2, MAX2+1,... MAX5, MAX5+1 are stored in sequence in the second part T2 of memory S.

Shorter access times can be achieved by use of the technique of FIG. 5, than by use of the technique of FIG. 2, when a particular CD-record includes both long and short recordings.

A still further example will be described with reference to FIG. 6. The parameters A, B and C will be the same as given in previous examples (i.e. A=20, B=10, C=32). As shown in FIG. 6, the first portion of T1 memory S of the CD-player has stored therein the first 10 titles of an inserted CD-record. The second portion of memory S has stored therein the titles (MAX1+1,MAX2+,... MAX10+1) of the recordings immediately following the ten longest recordings on the CD-record. The storage technique illustrated in FIG. 6 is especially advantageous for CD-records having recordings of very different length.

It is especially advantageous to partition a memory S into first (T1) and second (T2) parts, each part having a number of storage locations dependent upon the total number A of available storage locations in the CD-player, and upon the number of titles C recorded on an inserted CD-record. The parameter B which defines the number of locations in the first part (T1) of the memory can be calculated by, for example, a microprocessor. An expression which may be useful for calculating other values for the parameter B, for any inserted CD-record, is B=2A-C+1. Very short access times are achieved when the parameter B is calculated in this manner.

What is claimed is:

1. In a CD-player including a memory (S) having A storage locations for the storage of the index of an inserted CD-record, apparatus, comprising:
means for partitioning said memory (S) into a first part (T1) having B storage locations, and a second part (T2) having A-B storage locations when the number of titles C in the index of said CD-record exceeds the number of storage locations A of said CD-player, wherein the first B titles of said index are stored in sequence in the first part (T1), and A-B further titles are stored in the remaining A-B storage locations such that no continuing sequence will be formed with said first B titles.

2. Apparatus according to claim 1, wherein said remaining titles of the index, which are not stored in said first part (T1), are distributed equally over the A-B storage locations of said second part (T2) in such a way that only every (C-B)/(A-B)-th title is stored, said quotient (C-B)/(A-B) being rounded up to an integer number.

3. Apparatus according to claim 1, wherein from the remaining C-B titles of the index, which are not stored in said first part (T1), the A-B longest titles (MAX-1,MAX2,...) are stored in sequence in the second part (T2) starting with the longest title (MAX1).

4. Apparatus according to claim 1, wherein from the remaining C-B titles of the index, which are not stored in the first part (T1), the titles corresponding to the (C-B)/2 longest recordings (MAX1, MAX2, ...) and the respective titles of the recordings immediately following said longest recording titles (MAX1+1, MAX2+1, ...) are stored in sequence in the second part (T2) of memory S starting with the title of the longest recording (MAX1) in the second part (T2) of memory S.

5. Apparatus according to claim 1, wherein from the remaining C-B titles of the index, which are not stored in the first part (T1), the A-B titles corresponding to the recordings (MAX1+1, MAX2+1, ...) which immediately follow the A-B longest recordings (MAX1, MAX2, ...) are stored in sequence in the second part (T2) starting with title (MAX1+1) of the recording immediately following the title (MAX1) of the longest recording.

6. Apparatus according to claim 1, wherein said means for partitioning said memory (5) into a first part (T1) and a second part (T2), partitions said memory in accordance with the number A of storage locations in said CD-player and the number of recorded titles on said inserted CD-record.

7. Apparatus according to claim 2, wherein said means for partitioning said memory (5) into a first part (T1) and a second part (T2), partitions said memory in accordance with the number A of storage locations in said CD-player and the number of recorded titles on said inserted CD-player.

8. Apparatus according to claim 3 wherein said means for partitioning said memory (5) into a first part (T1) and a second part (T2), partitions said memory in accordance with the number A of storage locations in said CD-player and the number of recorded titles on said inserted CD-record.

9. Apparatus according to claim 4 wherein said means for partitioning said memory (5) into a first part (T1) and a second part (T2), partitions said memory in accordance with the number A of storage locations in said CD-player and the number of recorded titles on said inserted CD-record.

10. Apparatus according to claim 5 wherein said means for partitioning said memory (5) into a first part (T1) and a second part (T2), partitions said memory in accordance with the number A of storage locations in said CD-player and the number of recorded titles on said inserted CD-record.

11. Apparatus according to claim 6, wherein said parameter B defining the partitioning is calculated to be $B=2A-C+1$.

12. Apparatus according to claim 7, wherein said parameter B defining the partitioning is calculated to be $B=2A-C+1$.

13. Apparatus according to claim 8, wherein said parameter B defining the partitioning is calculated to be $B=2A-C+1$.

14. Apparatus according to claim 9, wherein said parameter B defining the partitioning is calculated to be $B=2A-C+1$.

15. Apparatus according to claim 10, wherein said parameter B defining the partitioning is calculated to be $B=2A-C+1$.

* * * * *